(12) United States Patent
Menard et al.

(10) Patent No.: US 9,339,431 B2
(45) Date of Patent: May 17, 2016

(54) VEHICLE WITH AT LEAST THREE STABLE BEARING POINTS ON THE GROUND

(75) Inventors: Olivier Menard, Grenoble (FR); Sae Kyoung An, Berlin (DE); Jerome Colleaux, Le Perray en Yvelines (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 202 days.

(21) Appl. No.: 14/123,424

(22) PCT Filed: May 24, 2012

(86) PCT No.: PCT/FR2012/051169
§ 371 (c)(1),
(2), (4) Date: Dec. 2, 2013

(87) PCT Pub. No.: WO2012/164208
PCT Pub. Date: Dec. 6, 2012

(65) Prior Publication Data
US 2014/0091543 A1 Apr. 3, 2014

(30) Foreign Application Priority Data
May 30, 2011 (FR) ...................................... 11 54720

(51) Int. Cl.
*A61H 3/04* (2006.01)
*B62K 3/00* (2006.01)
(Continued)

(52) U.S. Cl.
CPC .................. *A61H 3/04* (2013.01); *B62K 3/007* (2013.01); *B62K 5/007* (2013.01); *B62K 5/025* (2013.01); *A61H 2201/1633* (2013.01)

(58) Field of Classification Search
CPC ... A61H 3/04; A61H 2003/043; B62K 5/003; B62K 5/007; B62K 5/023; B62K 5/025; B62K 5/027; B62K 13/00; B62K 13/12; B62K 17/00; B62K 3/007; B62B 5/002; B62B 5/087; A63B 55/087
See application file for complete search history.

(56) References Cited

U.S. PATENT DOCUMENTS 3,434,558 A * 3/1969 Allen ...................... B62D 51/02
180/208
4,834,409 A * 5/1989 Kramer ............... B60B 35/1045
180/209
(Continued)

FOREIGN PATENT DOCUMENTS

DE 31 28 112 2/1983
EP 0 576 724 A1 1/1994
(Continued)

OTHER PUBLICATIONS

International Search Report issued Oct. 1, 2012 in PCT/FR2012/051169.

*Primary Examiner* — Katy M Ebner
(74) *Attorney, Agent, or Firm* — Oblon, McClelland, Maier & Neustadt, L.L.P

(57) ABSTRACT

A vehicle with at least three stable bearing points on the ground, of which at least one at the front and at least one at the rear of the vehicle, comprises an arm fixed to the front of the vehicle, at a free first end of which arm are mounted a steering unit, and a seat situated at the rear of the vehicle. The arm is movable relative to the seat between a first remote and lockable position, relating to a self-support mode, wherein a first distance is provided between the steering unit and the seat in order to receive a person in seated or semi-seated position on the seat, and a second closer and lockable position, relating to a walking assistance mode, wherein a second distance smaller than the first is provided between the steering unit and the seat. The steering unit forming a support means in this second position.

18 Claims, 2 Drawing Sheets

(51) Int. Cl.
B62K 5/007 (2013.01)
B62K 5/025 (2013.01)

(56) References Cited

U.S. PATENT DOCUMENTS

| | | | | | |
|---|---|---|---|---|---|
| 4,874,055 | A * | 10/1989 | Beer | ............... | B62B 5/0026 180/19.2 |
| 4,944,360 | A * | 7/1990 | Sturges | ............ | B62D 61/08 180/208 |
| 5,277,267 | A * | 1/1994 | Tiffany | ............ | B62K 5/027 180/208 |
| 5,346,028 | A | 9/1994 | Cassano | | |
| 6,378,642 | B1 * | 4/2002 | Sutton | ............ | B62D 61/08 180/208 |
| 6,474,427 | B1 * | 11/2002 | Tunnecliff | ......... | B62B 5/0026 180/19.1 |
| 7,134,677 | B2 * | 11/2006 | Opsvik | ............ | B62K 15/006 280/87.041 |
| 8,365,850 | B2 * | 2/2013 | Gal | .................. | A63B 55/087 180/19.1 |
| 2001/0013435 | A1 * | 8/2001 | Ono | ................ | B62B 5/0026 180/19.2 |
| 2002/0000702 | A1 * | 1/2002 | Charron | ............ | B62K 3/002 280/87.021 |
| 2002/0020570 | A1 * | 2/2002 | Hayashi | ............ | B62K 5/007 180/65.1 |
| 2003/0141121 | A1 * | 7/2003 | Flowers | ............ | A61G 5/045 180/65.1 |
| 2003/0168832 | A1 * | 9/2003 | Flowers | ............ | B62K 5/025 280/638 |
| 2007/0051548 | A1 * | 3/2007 | Kosco | ............... | B62K 5/025 180/208 |
| 2008/0023236 | A1 * | 1/2008 | Falkiner | ........... | A63B 55/087 180/65.1 |
| 2008/0245594 | A1 * | 10/2008 | Ishii | ................ | B62D 37/00 180/218 |
| 2009/0020350 | A1 * | 1/2009 | Wu | .................. | B62K 15/008 180/208 |
| 2009/0205893 | A1 * | 8/2009 | Pang | ............... | B62D 25/00 180/208 |
| 2009/0277700 | A1 * | 11/2009 | Falkiner | ........... | B62K 5/027 180/19.3 |
| 2009/0289091 | A1 * | 11/2009 | Ulrich | .............. | B62J 7/06 224/447 |
| 2010/0084831 | A1 * | 4/2010 | Wang | ............... | A61G 5/04 280/39 |
| 2010/0114468 | A1 * | 5/2010 | Field | ................ | B60N 2/045 701/124 |
| 2013/0192908 | A1 * | 8/2013 | Schlagheck | ........ | B60K 1/04 180/65.1 |

FOREIGN PATENT DOCUMENTS

WO    WO 2005/025972 A1    3/2005
WO    WO 2008/011705 A1    1/2008

\* cited by examiner

VEHICLE WITH AT LEAST THREE STABLE BEARING POINTS ON THE GROUND

BACKGROUND

This invention relates to a vehicle with at least three stable bearing points on the ground. In particular, an intended application of this invention if the design of a vehicle, more preferably light and not cumbersome, for assisting with the displacement of a person with reduced mobility, for example an elderly person.

The invention is as such more particularly applied to a vehicle with at least three stable bearing points on the ground, of which at least one at the front and at least one at the rear of the vehicle, comprising an arm fixed to the front of the vehicle, at a free first end of which arm are mounted steering means, and a seat situated at the rear of the vehicle.

Such a vehicle is known under different versions. It can in particular be motorised, driven by the muscular strength of the person who uses it or both motorised and drivable by muscular strength. It comprises in general three wheels, one at the front and the two others at the rear or two at the front and the last one at the rear. As is well known, three bearing points using these wheels are required in order to provide stability for the vehicle. When it is used in a situation of displacement, a person sits on the seat and guides the displacement of the vehicle using the steering means.

It is effectively possible to design such light and relatively non-cumbersome vehicles. The one described in patent U.S. Pat. No. 6,161,860 can as such be mentioned. But in fact this type of vehicle is not very adapted for the common displacements of a person who experiences difficulties in moving about, such as an elderly person or person with reduced mobility. In particular, it only allows for outdoor displacements and must be parked if the person wishes to enter a shop or other building because even so it is too cumbersome. Yet a person with reduced mobility experiences difficulties in moving about and in finding their balance, not only for their outdoor displacements, but also inside buildings, for example in shops in order to make purchases.

It can therefore be desired to provide a vehicle with at least three stable bearing points on the ground which makes it possible to overcome at least one portion of the aforementioned problems and restrictions, in particular the difficulty of adapting this type of vehicle to frequent changes in the types of displacements, in particular outdoor/indoor changes.

BRIEF SUMMARY

A vehicle is therefore proposed with at least three stable bearing points on the ground, of which at least one at the front and at least one at the rear of the vehicle, comprising an arm fixed to the front of the vehicle, at a free end of which arm are mounted steering means, and a seat situated at the rear of the vehicle, wherein the arm is movable relative to the seat between:
  a first remote and lockable position, relating to a self-support mode, wherein a first distance is provided between the steering means and the seat in order to receive a person in a seated or semi-seated position on the seat, and
  a second closer and lockable position, relating to a walking assistance mode, wherein a second distance shorter than the first is provided between the steering means and the seat, with the steering means forming in this second position a support means for a person walking behind the vehicle.

Such a vehicle can thus be used by the person both as self-support for outdoor displacements and as a walking assistant, for example such as a walker or equivalent, for outdoor and indoor displacements. In particular, in the walking assistance mode, as the bearing arm of the steering means is close to the seat, it has a reduced encumbrance suitable for use indoors, in shops or other buildings. Furthermore the passage from the first to the second position is simple since it concerns a priori solely on the displacement of the bearing arm of the steering means.

Advantageously, the vehicle comprises means for modifying the distance between the front, on the one hand, and rear, on the other hand, bearing points, when the arm passes from one to the other of said first remote and second closer positions.

The balance of the vehicle itself as well as its encumbrance become thus adjustable according to the usage mode of the vehicle.

Optionally, the means for modifying the distance between the front and rear bearing points are designed to bring closer the front, on the one hand, and rear, on the other hand, bearing points, when the arm passes from the first remote position to the second closer position.

The walking of the person behind the vehicle is thus facilitated in walking assistance mode.

Also optionally, the seat is mounted on a frame, with the arm of the steering means and the frame of the seat having complementary shapes in such a way that the arm of the steering means rests against the frame of the seat in the walking assistance mode.

Also optionally, the seat is mounted pivotingly on the frame around a transverse axis, between a first support position in self-support mode wherein its main plane of support is substantially parallel to the plane of the stable bearing points and a second retracted position in walking assistance mode wherein it is folded back at the rear of the frame.

Also optionally, a vehicle according to the invention can further comprise, at the front of the vehicle, a floor for supporting the feet of a person in seated or semi-seated position in the self-support mode, with this floor being integral with the frame whereon is mounted the seat, with the arm of the steering means being fixed freely to rotate around a transverse axis situated at the front of the vehicle.

Also optionally, a vehicle according to the invention can further comprise first means for fixing a container, arranged at the rear of the vehicle and provided to receive such a container in self-support mode, and second means for fixing the same container, arranged at the front of the vehicle and provided to receive such a container in walking assistance mode.

Also optionally, the first means of fixing are mounted at the rear of the frame under the seat and the second means of fixing are mounted at the front of the arm under the steering means.

Also optionally, a vehicle according to the invention can comprise two wheels at the front arranged on either side of a longitudinal plane of the vehicle, at least one motor for driving the two front wheels, for example one drive motor for each front wheel, and means for actuating said at least one drive motor arranged on the steering means.

Also optionally, said at least one motor is arranged between the two front wheels.

Also optionally, a vehicle according to the invention can comprise at least one wheel at the rear, mounted on a movable arm, with the means for actuating said at least one motor comprising means for offsetting a loss of balance.

Also optionally, a vehicle according to the invention can further comprise means for blocking at least one portion of the wheels of the vehicle and at least one directional detector of pressure or movement arranged on the steering means or on the arm in order to:

if the directional detector returns a measurement between a first predetermined threshold for detecting the intention to walk and a second predetermined threshold for detecting the loss of balance, actuate said at least one motor at a speed estimated using the measurement returned, otherwise, activate the means for blocking.

Also optionally, as the vehicle is provided with at least three wheels, the steering means comprise at least one directional detector of pressure exerted against them and means for controlling at least one portion of the wheels according to a pressure detected.

Also optionally, the steering means comprise a handlebar that can be adjusted around a transverse axis at the first free end of the arm.

BRIEF DESCRIPTION OF THE DRAWINGS

The invention shall be better understood using the following description, provided solely by way of example and in reference to the annexed drawings wherein.

DETAILED DESCRIPTION

Figure 1:
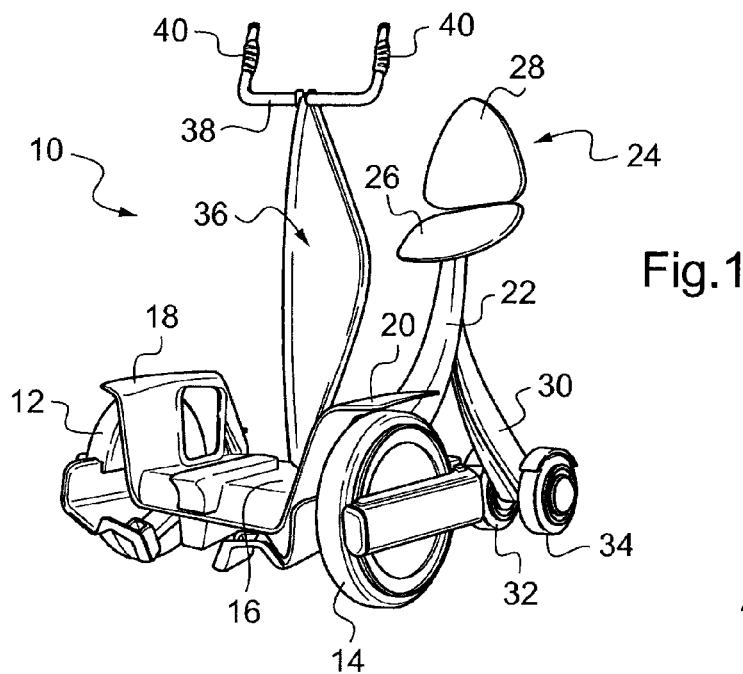
FIG. 1 shows diagrammatically and in front perspective the general structure of a vehicle according to an embodiment of the invention, in a first self-support position.

The vehicle 10 shown in FIG. 1 comprises two wheels 12 and 14 at the front, freely rotatable about an axis for example borne by a floor 16 intended to remain parallel to the ground. This floor 16 extends between the two front wheels and may even comprise edges 18 and 20 on its left and right sides rising vertically in order to partially cover the two front wheels 12, 14 and as such form two mud flaps.

The floor 16 extends towards the rear of the vehicle 10 in the form of a narrower frame 22. In a first portion, the frame 22 extends towards the rear and slightly at a height, then curves upwards in a second portion at the free end of which is mounted a seat 24. The seat 24 comprises a base 26 whereon a person is intended to sit and optionally a seatback 28 against which this same person can rest their back. In the first self-support position shown in FIG. 1, the base 26 is horizontal or slighting descending towards the front, in order to adapt to the morphology of a person in a seated or semi-seated position on the vehicle. The seatback 28 is substantially vertical.

In the middle of the frame 22, i.e. in the vicinity of its greatest curvature between the first and second portions, a rear arm 30 extends towards the rear of the vehicle 10 and downwards in order to bear, at its free end, one or two rear wheels. Its free end can then take the form of a fork in order to bear a single rear wheel, or, as shown in FIG. 1, comprise a transverse axis that bears two wheels 32 and 34. In the case where the vehicle 10 comprises two rear wheels such as shown in the example of FIG. 1, they can be of smaller size and closer to the main longitudinal plane of the vehicle 10 than the two front wheels 12 and 14. It is then the front wheels that provide for the lateral balance of the vehicle 10. A minimum of three unaligned wheels are required in order to form a stable bearing for the vehicle 10 on the ground. In the case where a single wheel is provided at the rear of the vehicle, the latter can be swivelling.

Figure 6:
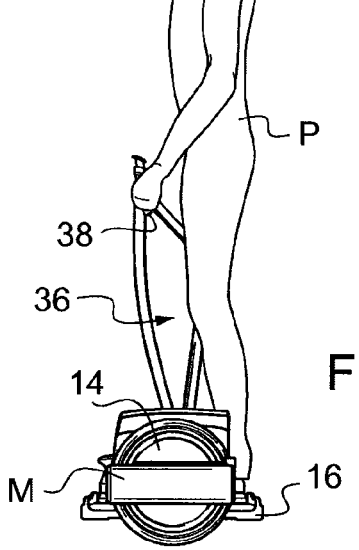
FIG. 6 is a side view of the vehicle of FIG. 1, in another optional unstable self-support position and in a situation of use by a person standing on the vehicle.

The rear arm 30 can be rigidly fixed on the frame 22, but optionally, it can also be mounted movably so as to be able to remove the rear wheels 32, 34 in an unstable configuration of the vehicle 10 of which details shall be provided in reference to FIG. 6.

At the front of the vehicle 10, an arm 36 is mounted freely rotatable at one of its ends around a transverse axis borne for example by the floor 16. At its other end, steering means are fixed, for example a handlebar 38 comprising a transverse tubular arm. The handlebar 38 may further comprise two handles 40 arranged at a right angle to the two ends of its tubular arm and intended to respectively receive the two hands of a person using the vehicle 10 in order to move about. The handlebar 38 with the two handles 40 can be mounted in an adjustable manner around a transverse axis borne by its tubular arm for a better adaptation to the choice of the user.

Figure 2:
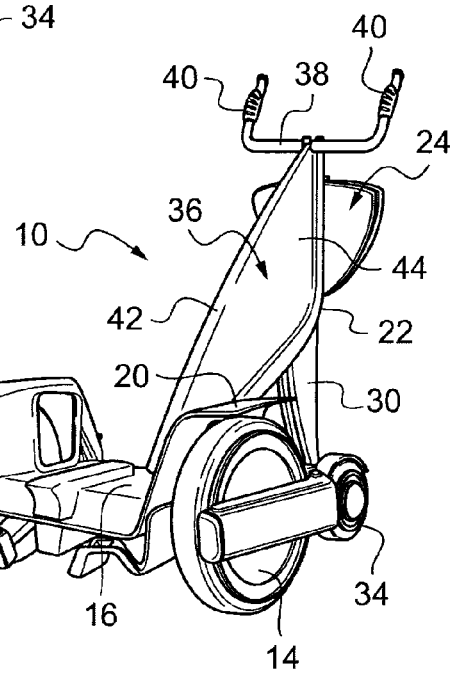
FIG. 2 shows diagrammatically and in front perspective the general structure of the vehicle of FIG. 1, in a second walking assistance position.

Since it is mounted freely rotatable at the front of the vehicle 10, the arm 36 can be displaced in rotation in the main longitudinal plane of the vehicle 10 between:

a first remote position such as shown in FIG. 1, relative to the self-support mode, wherein a first distance is provided between the handlebar 38 and the seat 24 in order to receive a person in a seated or semi-seated position on the seat, and a second closer position such as shown in FIG. 2, relating to a walking assistance mode, wherein a second distance shorter than the first is provided between the handlebar 38 and the seat 24, with the handlebar 38 forming in this second position a support means for a person walking behind the vehicle 10.

The two positions shown in FIGS. 1 and 2 are lockable in order to maintain the one that is desired over a given journey. In a manner known per se, simple and rapid means for locking/unlocking (not shown) each of the two positions are provided, for example on the arm 36 or on the handlebar 38, in such a way that the user can easily pass from one to the other of the two aforementioned operating modes of the vehicle 10.

In practice, the first distance must be established in such a way as to provide sufficient space between the handlebar 38 and the seat 24 in order to receive the person in seated or semi-seated position. This distance is as such preferably greater than 30 cm, more preferably greater than 50 cm, and even more preferably greater than 70 cm. In this self-support mode, the handlebar 38 is generally located in front of and above the seat 24.

Also in practice, the second distance must be established in such a way that no sufficient space is provided between the handlebar 38 and the seat 24 in order to receive the person in seated or semi-seated position. This second distance is preferably substantially shorter than the first, for example less than 10 cm, more preferably less than 5 cm. In this walking assistance mode, the handlebar 38 is general located against the seat 24, even slightly or partially behind if the latter can be folded back.

By way of a non-restricted example, in the second walking assistance position shown in FIG. 2, the arm 36 rests against the frame 22. More precisely, the arm 36 is for example comprised of a tubular bearing frame 42 and of an aileron 44 extending over the entire length of the tubular bearing frame 42, with the shape of the aileron 44 being in particular chosen to correspond to the curved shape of the frame 22 bearing the seat 24. A rail can in particular be arranged in the frame 22 in order to precisely receive the aileron 44.

According to this embodiment, the seat 24 is advantageously mobile in rotation around a transverse axis borne by the frame 22 in order to be able to be retracted at the rear of the vehicle 10. As such, as shown in FIG. 2, the base 26 and the seatback 28 of the seat 24 are both folded back behind the frame 22 in walking assistance mode. The position of the handles 40 can also be adjusted by the user, in particular with respect to horizontality, for better grasping and better usage in walking assistance mode.

Figure 3:
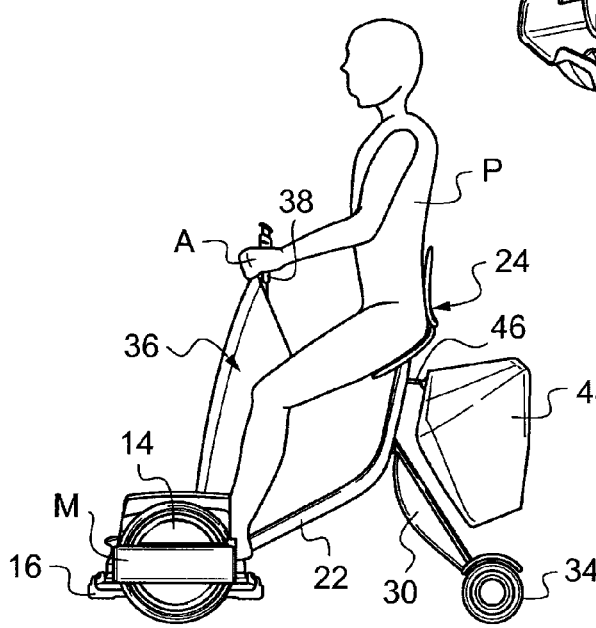
FIG. 3 is a side view of the vehicle of FIG. 1, in its first self-support position and in a situation of use by a person seated or semi-seated on the vehicle.

The practical use of the vehicle 10 is shown in FIG. 3 in the self-support mode. In this mode, the seat 24 is in support position and the arm 36 is locked in its first position, the handlebar 38 is separated from the seat 24, so that a person P can position themselves on the vehicle 10. The feet of the person P rest on the floor 16 while this person is in a seated or semi-seated position on the seat 24. The seated position is distinguished from the semi-seated position by the inclination of the thighs of the person P, more or less close to horizontality. In particular, an advantage of a conformation of the vehicle 10 allowing for a semi-seated position of the person P, is that the latter can as such be located at the normal height of a person standing walking at its sides, in order to conjugate normal sociability and a rest in mobility.

Optionally, first means for fixing 46 a container 48 are provided at the rear of the vehicle 10. They comprise for example a hook mounted at the rear of the frame 22, under the seat 24. This hook 46 makes it possible to use the container 48 in self-support mode of the vehicle 10.

Finally, the displacement of the vehicle 10 is provoked by the actuating of a motor M arranged in the thickness of the floor 16 or by two individual motors arranged respectively against the two front wheels 12 and 14. The means for actuating (acceleration, slowing down) A this motor or motors M are for example offset on the handlebar 38 and more precisely even on the handles 40. The precise operations of the motor M and of the means for actuating are not the object of this invention. They are considered to be conventional, with the driving of the front left 14 and right 12 wheels able to be more or less independent according to the desired applications and costs. Moreover, note that different possibilities for articulating the arm 36 can be exploited in the actuating of the motor M.

Figure 4:
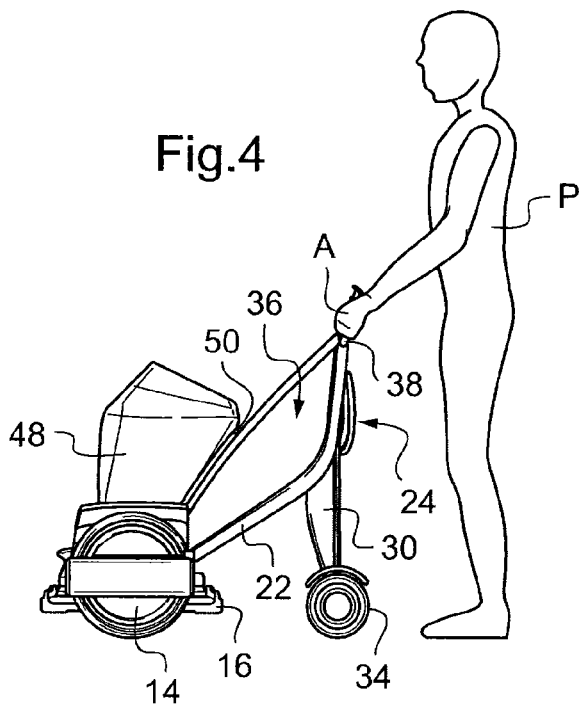
FIGS. 4 and 5 are side views of the vehicle of FIG. 1, in its second walking assistance position and in a situation of use by a person walking behind the vehicle.

The practical use of the vehicle 10 is shown in FIG. 4 in the walking assistance mode. In this mode, the seat 24 is in retracted position, i.e. folded back against the frame 22, and the arm 36 is locked in its second position, the handlebar 38 against the free end of the frame 22, so that the person P cannot position themselves on the vehicle 10. On the other hand, the person P can walk behind the vehicle 10 by keeping themselves standing in balance thanks to the handles 40 of the handlebar 38 which can now be accessed from the rear of the vehicle 10.

Optionally, second means 50 for fixing the container 48 are provided at the front of the vehicle 10. They comprise for example a hook mounted at the front of the arm 36 under the handlebar 38. This hook 50 makes it possible to use the container 48 in walking assistance mode of the vehicle 10.

Also optionally, the rear arm 30, whether or not it is fixed in a removable manner, can be adjustable in order to allow for a coming closer together of the rear wheels 32, 34 and of the front wheels 12, 14 in the walking assistance mode, in such a way as to facilitate the walking of the person P behind the vehicle 10. In this way, the distance between the rear wheels (32, 34), on the one hand, and the front wheels (12, 14), on the other hand, can be respectively between 50 cm and 120 cm in the first remote position, and between 20 cm and 50 cm in the second closer position. As such, the vehicle 10 comprises means for modifying the spacing between the rear wheels 32, 34 and the front wheels 12, 14, or more generally between the front and rear bearing points, when it passes from one to the other of the aforementioned positions. In the example shown, these means for modifying the spacing of the rear and front bearing points are materialised by the rear arm 30 when it can be adjusted.

When the vehicle 10 comprises one or several motors M arranged between the two front wheels 12 and 14, the weight of the vehicle is substantially concentrated between these two front wheels. This favours the stability of the vehicle 10 when it is used in the second closer position, i.e. according to the walking assistance mode. It is understood that if the motor or motors M were arranged on rear wheels 32 and 34 of the vehicle 10, the latter would tend to tip towards the rear when the handlebar 38 is pressed in walking assistance mode.

Finally, the displacement of the vehicle 10 is always actuated using the motor or motors M through acceleration and deceleration by the person P using the handles 40 of the handlebar 38.

Figure 5:
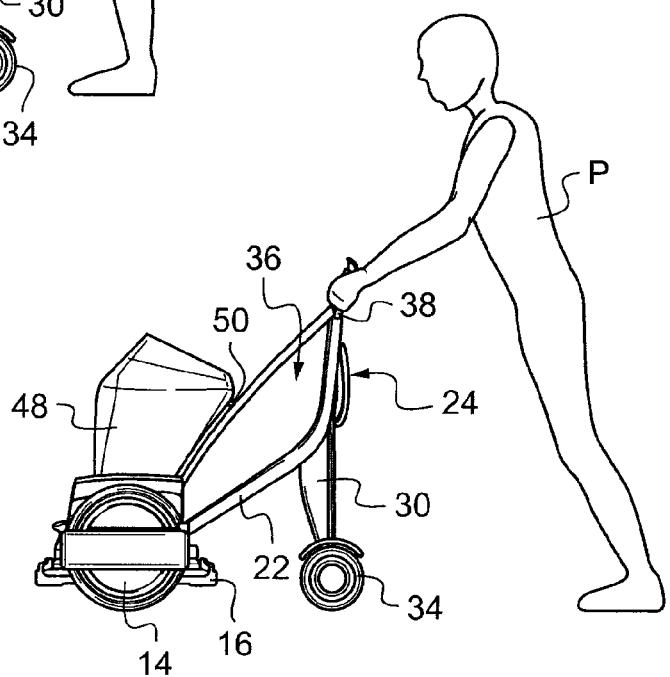

Optionally, the handles 40 of the handlebar 38 can be provided with directional detectors of pressure exerted against them, with these detectors being connected to means of controlling the front wheels 12, 14 of the vehicle 10, for example brakes (not shown). More precisely, as shown in FIG. 5, in the walking assistance mode, it can be interesting to detect an involuntary loss of balance of the person P. More generally, it can be interesting to detect situations wherein the front 12, 14 or rear 32, 34 wheels have to be blocked so that the vehicle 10 constitutes a rebalancing fixed reference for the person P. As such, the means for controlling can be simply designed, in particular programmed, to stop all displacement of the vehicle 10, when a vertical pressure from the top downwards (i.e. vehicle 10 used as a support) or when an abrupt change in pressure (i.e. beyond a certain predetermined threshold), regardless of its orientation, is detected. For example, an imbalance can be measured on handlebar 38 or on the arm 36, by using sensors such as pressure sensors, accelerometers (it is then considered that there is an imbalance when the arm 36 undergoes an acceleration beyond a given threshold, in one or several directions), or inclinometers (it is then considered that there is an imbalance when the arm 36 is inclined beyond a given angle). When such an imbalance is detected, the vehicle 10 can re-establish the balance of the person P, for example by blocking itself.

FIG. 6 shows an additional operating mode of the vehicle 10, which is entirely optional. If the motor or motors M are provided with means for offsetting the loss of balance and if the rear arm 30 is movable in order to allow for the removal of the rear wheels, finally if the bearing frame 22 of the seat 24 can be folded back towards the front against the bearing arm 36 of the handlebar 38 in lockable orthogonal position in relation to floor 16, then the vehicle 10 can be used in unstable self-support mode. In this mode, the person P is standing on the floor 16 of the vehicle 10 which is displaced as an unstable bearing on the ground thanks solely to the two front wheels 12 and 14. As is well known, when the person P moves away from verticality, the imbalance that this generates is offset by an acceleration or a deceleration of the motor M.

According to an additional and optional operating mode, when the person P is situated behind the vehicle 10, as is shown in FIGS. 4 and 5 in walking assistance mode, the vehicle 10 can comprise means for detecting an intention to walk of the person P. For this, movement sensors of the handlebar 38 or of the arm 36 can be implemented such as described hereinabove (pressure sensor, accelerometer, inclinometer), with these sensors acting on the motor or motors M according to the movement of the arm 36 detected. This makes it possible to adjust the driving of the wheels according to the attitude of the person P. This improves the walking assistance. When the movement of the arm 36 exceeds a certain threshold (angle limit, pressure limit, acceleration limit or time-based variation of these parameters), as described hereinabove, the means for controlling conclude that there is a loss of balance, and then block the vehicle 10. As such, according to this operating mode, there is a first threshold, above which it is considered that the person wants to walk, and the vehicle 10 acts as walking assistance, with the speed of the wheels being adjusted according to the movement exerted on the arm 36 or on the handlebar 38. Above a second threshold, higher than the first, the means for controlling detect a loss of balance and block the vehicle 10 in order to re-establish the balance of the person P. More generally, between the two thresholds, an intention to walk is detected and the motor or motors M are acted on for an actuating at a speed estimated using the measurement returned, otherwise the means of blocking are activated.

It clearly appears that a vehicle such as that described previously allows for genuine assistance in the displacement for a person whose mobility is reduced due to a handicap or their age. This vehicle can be used indoors as well as outdoors thanks to its reconfigurability according to common methods of use, the self-support mode suited for displacements that are rather quick outdoors, and the walking assistance mode suited for slower displacements and indoors.

Thanks to hooks 46 and 50, this vehicle is in particular of very practical use for making purchases.

In walking assistance mode, its handlebar can easily be provided with sensors in order to detect losses of balance and offset them where applicable.

Also in walking assistance mode, the presence of a motor that can be actuated at the handlebar makes it possible to more easily overcome certain obstacles, while a simple walker does not allow for this. It also allows for the transport of heavier loads.

Note moreover that the invention is not limited to the embodiment described hereinabove.

In particular, the vehicle can be provided with only three wheels, which constitutes the minimum for it to have a stable bearing on the ground. The two wheels outside of the longitudinal plane providing the lateral balance of the vehicle can be rear wheels. In this case, a single wheel at the front can be sufficient.

The handlebar 38 can further be replaced with a steering wheel or any other equivalent steering means.

The floor, bearing arms, frame or frames of the vehicle are also no longer necessarily organised exactly as in FIGS. 1 to 6, as many functionally similar alternatives can be imagined.

It will appear more generally to those skilled in the art that diverse modifications can be made to the embodiment described hereinabove, in light of the information which has just been disclosed about it. In the following claims, the terms used are not to be interpreted as limiting the claims to the embodiment exposed in this description, but must be interpreted to include therein all of the equivalents that the claims aim to cover due to their formulation and of which the projection is within the scope of those skilled in the art by applying their general knowledge to the implementation of the information which has just been disclosed to them.

The invention claimed is:

1. A vehicle with at least three stable bearing points on the ground, of which at least one is located at the front of the vehicle and at least one is located at the rear of the vehicle, said vehicle comprising:
    at least one wheel at the front of the vehicle and at least on wheel at the rear of the vehicle;
    a front arm rotatably mounted to a floor at the front of the vehicle;
    steering means mounting at a free first end of the front arm;
    a seat situated at the rear of the vehicle and connected to the floor by a frame; and
    a rear arm extending downward from the frame, a first end of the rear arm being removably mounted to the frame and a second end of the rear arm bearing the at least one wheel at the rear of the vehicle,
    wherein the front arm is movable relative to the seat between:
        a first remote and lockable position, relating to a self-support mode, wherein a first distance is provided between the steering means and the seat in order to receive a person in seated or semi-seated position on the seat, and
        a second closer and lockable position, relating to a walking assistance mode, wherein a second distance shorter than the first distance is provided between the steering means and the seat, with the steering means forming in the second position a support means for a person walking behind the vehicle, and
    wherein the rear arm is adjustable between a closer position in which the at least one wheel at the rear of the vehicle is directly below the seat in the walking assistance mode and a remote position in which the at least one wheel at the rear of the vehicle is entirely behind the seat in a longitudinal direction in the self-support mode.

2. The vehicle according to claim 1, wherein the front arm and the frame have complementary shapes in such a way that the front arm rests against the frame in the walking assistance mode.

3. The vehicle according to claim 2, wherein the seat is mounted pivotingly on the frame around a transverse axis, between a first support position in self-support mode wherein a main plane of support of the seat is substantially parallel to a plane of the stable bearing points and a second retracted position in walking assistance mode wherein the seat is folded back at the rear of the frame.

4. The vehicle according to claim 3, wherein the floor supports the feet of a person in seated or semi-seated position in the self-support mode, the floor being integral with the frame whereon is mounted the seat, the front arm being fixed freely to rotate around a transverse axis situated at the front of the vehicle.

5. The vehicle according to claim 2, wherein the floor supports the feet of a person in seated or semi-seated position in the self-support mode, the floor being integral with the frame whereon is mounted the seat, the front arm being fixed freely to rotate around a transverse axis situated at the front of the vehicle.

6. The vehicle according to claim 1, further comprising first means for fixing a container, arranged at the rear of the vehicle and provided for receiving such a container in self-support mode, and second means for fixing the same container, arranged at the front of the vehicle and provided for receiving such a container in walking assistance mode.

7. The vehicle according to claim 6, wherein the first means for fixing are mounted at the rear of the frame under the seat and the second means for fixing are mounted at the front of the front arm under the steering means.

8. The vehicle according to claim 1,
wherein the at least one wheel at the front of the vehicle includes two front wheels arranged on either side of a longitudinal plane of the vehicle, and
wherein the vehicle includes at least one motor for driving the two front wheels and means for actuating said at least one drive motor arranged on the steering means.

9. The vehicle according to claim 8, wherein said at least one motor is arranged between the two front wheels.

10. The vehicle according to claim 9, wherein the means for actuating said at least one motor comprises means for offsetting a loss of balance.

11. The vehicle according to claim 9, further comprising means for controlling at least one portion of the wheels of the vehicle and at, least one directional detector of pressure or movement arranged on the steering means or on the front arm in order to:
if the directional detector returns a measurement between a first predetermined threshold for detecting the intention to walk and a second predetermined threshold for detecting a loss of balance, actuate said at least one motor at a speed estimated using the measurement returned,
otherwise, activate the means for controlling to block the wheels of the vehicle.

12. The vehicle according to claim 8, wherein the means for actuating said at least one motor comprises means for offsetting a loss of balance.

13. The vehicle according to claim 12, further comprising means for controlling at least one portion of the wheels of the vehicle and at least one directional detector of pressure or movement arranged on the steering means or on the front arm in order to:
if the directional detector returns a measurement between a first predetermined threshold for detecting the intention to walk and a second predetermined threshold for detecting a loss of balance, actuate said at least one motor at a speed estimated using the measurement returned,
otherwise, activate the means for controlling to block the wheels of the vehicle.

14. The vehicle according to claim 8, further comprising means for controlling at least one portion of the wheels of the vehicle and at least one directional detector of pressure or movement arranged on the steering means or on the front arm in order to:
if the directional detector returns a measurement between a first predetermined threshold for detecting the intention to walk and a second predetermined threshold for detecting a loss of balance, actuate said at least one motor at a speed estimated using the measurement returned,
otherwise, activate the means for controlling to block the wheels.

15. The vehicle according to claim 8, wherein the means for actuating includes handles.

16. The vehicle according to claim 1, wherein the steering means comprise at least one directional detector of pressure exerted against them and means for controlling at least one portion of the wheels according to a pressure detected.

17. The vehicle according to claim 1, wherein the steering means comprise a handlebar that can be adjusted around a transverse axis at the first free end of the front arm.

18. A vehicle, comprising:
at least one wheel at a front of the vehicle and at least one wheel at a rear of the vehicle;
a front arm rotatably mounted to a floor at the front of the vehicle;
steering means mounted at a free end of the front arm;
a seat situated at the rear of the vehicle and connected to the floor by a frame; and
a rear arm extending downward from the frame, the rear arm being detachable from the frame,
wherein the front arm is movable relative to the seat between:
a first remote and lockable position, relating to a self-support mode, wherein a first distance is provided between the steering means and the seat in order to receive a person in seated or semi-seated position on the seat,
a second closer and lockable position, relating to a walking assistance mode, wherein a second distance shorter than the first distance is provided between the steering means and the seat, with the steering means forming in the second position a support means for a person walking behind the vehicle, and
a third lockable position, relating to a standing mode, wherein the rear arm is detached from the frame and the frame is folded towards the front against the front arm in an orthogonal direction in relation to the floor for a person standing on the floor of the vehicle.

* * * * *